March 24, 1936.  A. A. ENGLISH  2,035,117
APPARATUS FOR MOLDING WAX
Filed April 13, 1933   5 Sheets-Sheet 2

Aden A. English Inventor
W. E. Currie Attorney

March 24, 1936.   A. A. ENGLISH   2,035,117

APPARATUS FOR MOLDING WAX

Filed April 13, 1933   5 Sheets-Sheet 3

Aden A. English   Inventor
W. E. Currie   Attorney

March 24, 1936.  A. A. ENGLISH  2,035,117
APPARATUS FOR MOLDING WAX
Filed April 13, 1933  5 Sheets-Sheet 4

Aden A. English Inventor
W. E. Currie Attorney

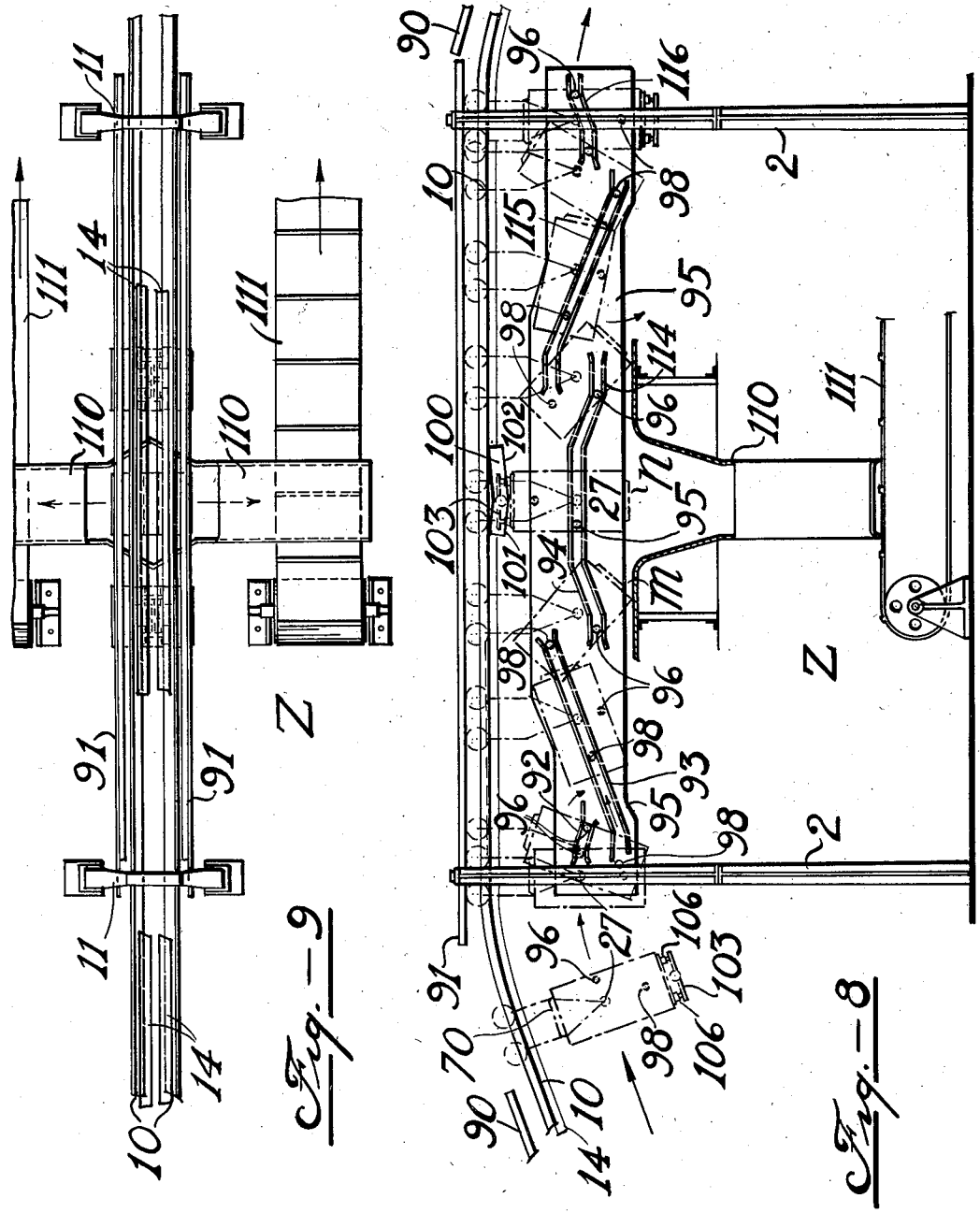

Patented Mar. 24, 1936

2,035,117

UNITED STATES PATENT OFFICE 2,035,117

APPARATUS FOR MOLDING WAX

Aden A. English, Cranford, N. J., assignor to Standard Oil Development Company, a corporation of Delaware Application April 13, 1933, Serial No. 665,883

12 Claims. (Cl. 18—26)

This invention relates to the solidification of substances which are liquid when hot and solidify on cooling. More particularly the invention relates to improvements in method and apparatus for continuously molding melted paraffin, wax, soap and the like into cakes.

It is an object of this invention to provide for the mechanical intermittent injection of molten wax into molds. Another object is to provide for continuously molding wax into cakes with a minimum of floor space for a given cooling time. Other objects will be apparent from the specification and from the accompanying drawings, in which latter Fig. 1 is a diagrammatic top plan view of the wax molding equipment.

Fig. 8 is a detail side elevational view of the mold turn-over and cake ejecting mechanism at station Z of Fig. 1; and Fig. 9 is a top plan view of the mold turn-over and cake ejecting mechanism at station Z.

Figure 1:
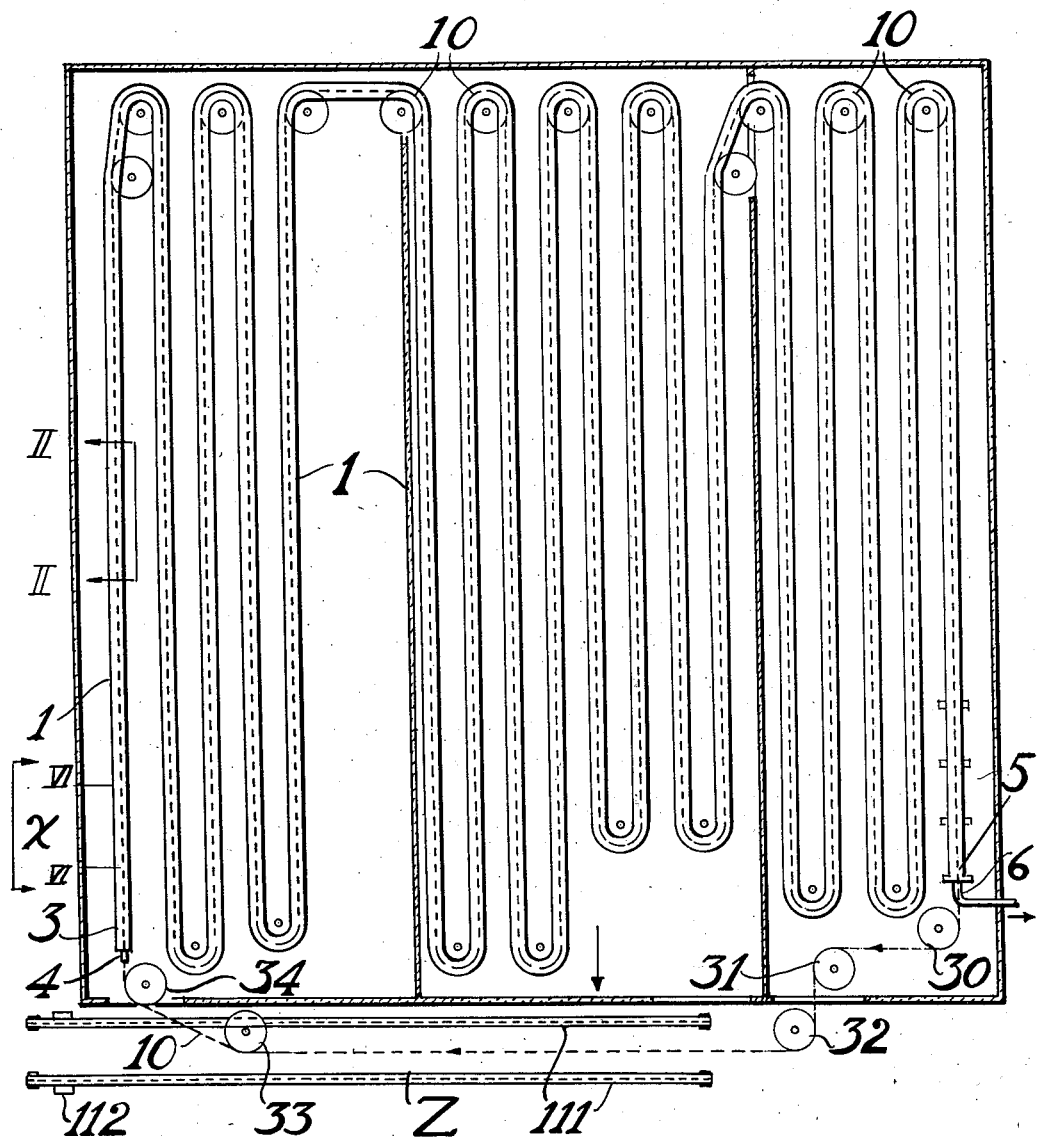

Referring particularly to the drawings, reference numeral 1 designates a trough substantially of U shape in transverse section supported at spaced intervals by means of a bracket 2. The trough 1 is given a suitable serpentine form to enable it to be disposed in a confined space. The trough 1 is provided with an inlet end 3 into which cooling liquid such as salt water or the like is introduced through a line 4. The water flows through the trough to an outlet end 5 from which it is withdrawn by means of a discharge line 6. The trough is maintained substantially full of cooling water throughout its extent.

Portable molds A, B, C and D for the refined or scale wax or the like are mounted to be drawn continuously through the water in the trough by a traveling conveyor from the inlet end of the trough to the discharge end of the trough. The traveling conveyor is of the trolley type and made continuous by a plurality of operatively connected mold hangers. The molds are supported from a suitable runway 10 carried by overhead hangers or bracket arms 11 which project upwardly from the bracket 2 over the open top of the trough 1. The runway 10 comprises angle bars which are supported in spaced relation to each other upon shoulders 12 projecting horizontally toward each other from the bracket arms 11. The angle bars include substantially horizontally disposed flanged portions 14 and substantially vertically disposed flanged portions 15. The molds A, B, C and D are suspended from the runway by means of a hanger 18. The hanger 18 is secured to a conveyor chain 20. The links 19 are supported by trolley wheels 25 which ride upon the flanges 14 of the runway 10. Wheels 26 rotatably carried by the links 19 engage the flanges 15 of the runway 10.

The molds A and B and the molds C and D each constitute mold units. The mold units are rotatably supported on opposite sides of the hanger 18 by means of a trunnion or arm 27. The hanger 18 carries below the trunnion 27 a spring 29 which engages the adjacent side walls of the molds B and C and functions to keep the molds in their upright position. Each mold is provided with laterally extending fins 28 to provide increased cooling area. The molds of each unit are disposed in spaced relation to each other to permit of the flow of cooling water therebetween. Each mold is of a size to produce a commercial cake molded on end to produce a uniform weight and size. For example, the cake may be 12 inches wide, 1½ inches thick and 19 inches long. The runway 10 and chain 20 extend throughout the extent of the trough in position to suspend the mold units within the cooling water within the trough. The chain 20 leads from the outlet end 5 of the trough around sprocket wheels 30, 31, 32, 33 and 34 to the inlet end of the trough. The chain is driven continuously in travel by suitable means, not shown.

As each of the mold units is conducted in travel past the filling station X, the molds are filled with the liquid to be molded through the following arrangement of parts: Duplicate pairs of discharge lines 38 and 38a for the molten liquid are supported in position by brackets 39 to discharge by gravity into the molds. The brackets 39 are supported from the wall of the trough 1. Each pair of discharge lines 38 and 38a lead from manifolds 41 which in turn connect through lines 42 with supply tank 43 containing the wax in its molten condition. The manifolds are arranged in pairs, and being fed by gravity from the overhead tank the static head upon the liquid wax is always uniform. Preferably, the piping and valves are steam jacketed and insulated to prevent any cooling and resultant clogging.

The delivery of molten wax is controlled by means of quick acting filling valves 45 which cooperate to constitute a tandem valve. The valves are identical in construction and like reference numerals will be applied to like parts.

Each valve 45 is actuated by means of an air cylinder 48 supported by a bracket 48a from the walls of the trough 1. Each air cylinder 48 is provided with a piston 49, the piston rod 50 of which extends through opposite ends of the cylinder 48. Each piston rod 50 is connected at opposite ends through links 51 and 52 with levers 53 which actuate the valves 45.

Reciprocation of the piston 49 within each air cylinder is controlled by means of air from air supply pipes 60. The air supply pipes 60 are connected with air lines 61 and 62 which open into opposite ends of the cylinder 48. Flow of air from the air supply pipes 60 through the lines 61 and 62 is controlled by means of four-way air valves 63. By use of the air cylinder to operate the wax flow valve, intermittent filling, high speed, and accuracy are permitted.

Each four-way valve 63 is actuated as follows: Solenoids 65 carried by the wall of the trough 1 carry a movable core, not shown, which is connected through links 66, 67 and lever 68 with the valve 63. Each solenoid 65 is provided with a coil 69 which is energized when the mold units are in position to be filled with liquid from the nozzles 38 and 38a as follows: Alternate mold units carry a cam 70 upon their upper surface. The cam is provided with an inclined surface 71 and an elongated high spot 72. A cam lever 74 is pivotally supported at 75 by the bracket 39 and carries at its free end a cam follower 76 adapted to engage the cam 70. The opposite end of the cam lever 74 is provided with an electrical contact member 78. The contact member 78 is carried to and from engagement with a similar electrical contact member 79 carried by the bracket 39. Contact between the members 78 and 79 is normally broken by means of the helical spring 80, one end of which is connected to the bracket 39 and the other end of which is connected to the cam lever 74. The contact members 78 and 79 are connected by electrically conductive members 83 and 84 with the solenoid. The members 83 and 84 connect also with a suitable source of electricity, not shown. Engagement of the cam 70 with the cam lever 74 closes the electric circuit while the mold units are in position to receive the liquid to be molded from the discharge lines 38 and 38a. Upon energizing the solenoid the core of the solenoid is drawn longitudinally to actuate the valve 63 to open position. When the cam 70 is drawn past the cam follower 76 the solenoid is deenergized and a spring 77 actuates the valve 63 to closed position.

The mold units containing the molten liquid are drawn through the trough partially submerged in the cooling water, until the liquid solidifies into cakes. The trough is of sufficient length to permit sufficient time for the liquid to solidify. The trolley track 10 and chain conveyor 20 are inclined upwardly at the discharge end 5 of the trough to permit the mold units to clear the end of the trough. The mold units are then conducted to the station Z where the molds are inverted and the cakes of wax are ejected from the molds. The inclined sections of trackage are provided with guiderails 90. The trackage at station Z is substantially horizontal and is provided with a guiderail 91.

The molds are inverted and subsequently returned to their upright position by the following arrangement of parts at station Z: The molds are inverted by camways 92, 93 and 94 which are supported upon a bracket 95 carried by the frame 2. Camway 92 is positioned to engage a camroll 96 which protrudes laterally from an intermediate portion of the side wall of the mold. The walls of the camway diverge at the inlet end of the camway 92 to receive the camroll 96. An intermediate portion of camway 92 inclines downwardly to effect initial pivotal movement of the mold about its trunnion 27, as can be clearly seen in Fig. 8. A camroll 98 protrudes outwardly from the side wall of the mold at the base of the mold. The camrolls 98 function as guide rolls to engage the walls of the trough and prevent weaving. Continued forward travel of the mold with the conveyor brings the camroll 98 into the converging inlet of the camway 93. Further travel of the mold causes the camroll 96 to be drawn clear of the camway 92. The camway 93 is inclined upwardly from its inlet end and causes the camroll 98 to be lifted as the mold is conducted to the right as viewed in Fig. 8, thereby causing the mold to be rotated about its trunnion 27 to the partially inverted position shown in dot and dash lines at M. At station M the camroll 96 is drawn into the converging entrance of the camway 94 and the camroll 98 is drawn clear of the camway 93. The camway 94 is inclined upwardly for a sufficient distance to complete the upending of the mold. The camway 94 then extends substantially horizontally whereby the mold is carried for a continued distance in its inverted position.

Figure 3:
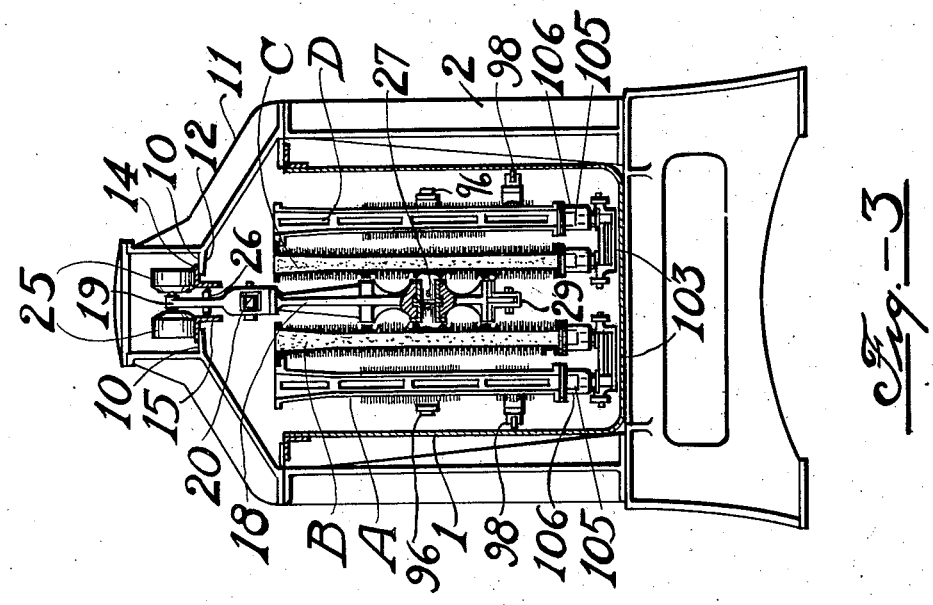
Fig. 3 is a transverse sectional view along the line III—III of Fig. 2.
Figure 2:
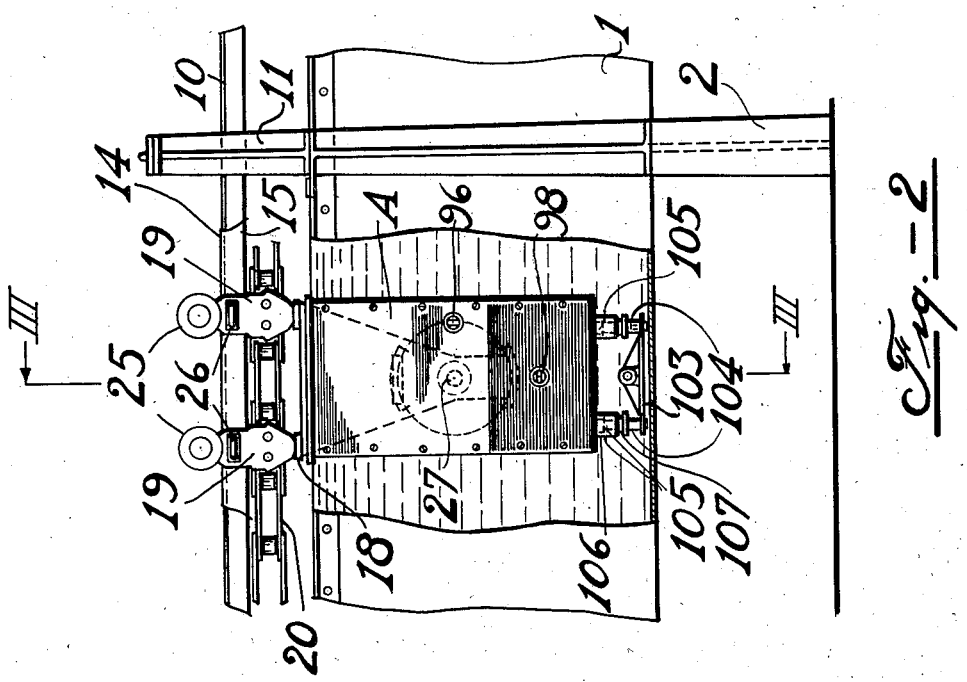
Fig. 2 is a side elevational view of the trough taken along the line II—II of Fig. 1 and with parts broken away showing in side elevation a mold.
Figure 4:
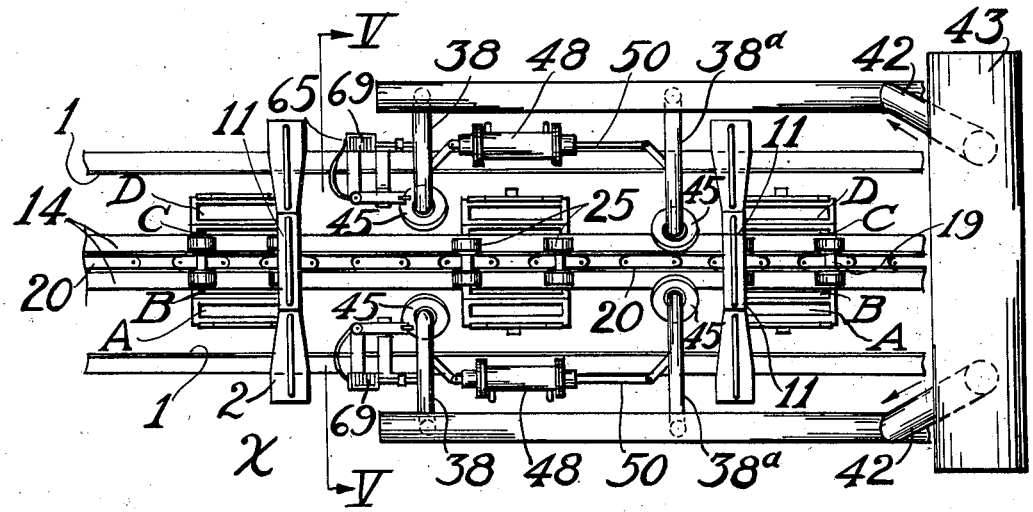
Fig. 4 is a top plan view of the machine taken at filling station X and showing the mold filling mechanism.
Figure 5:
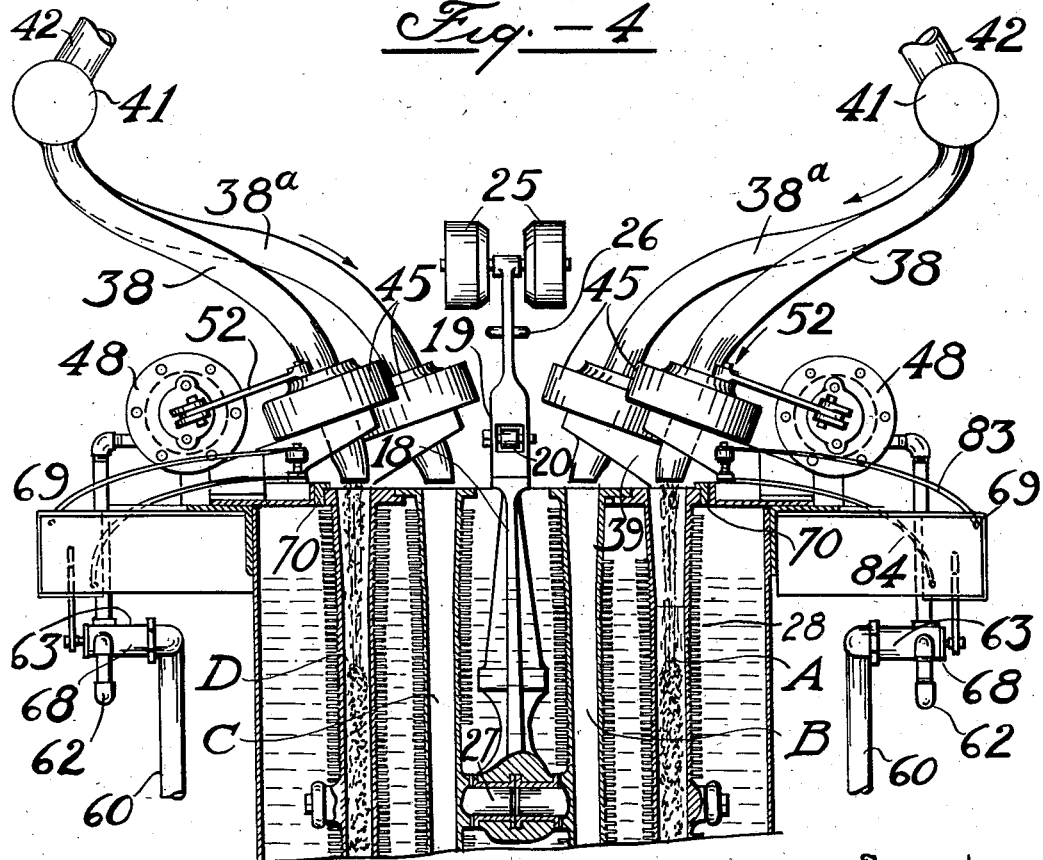
Fig. 5 is a detailed transverse sectional view through the trough and molds taken along the line V—V of Fig. 4 and showing the filling manifolds and their control valves in front elevation.
Figure 7:
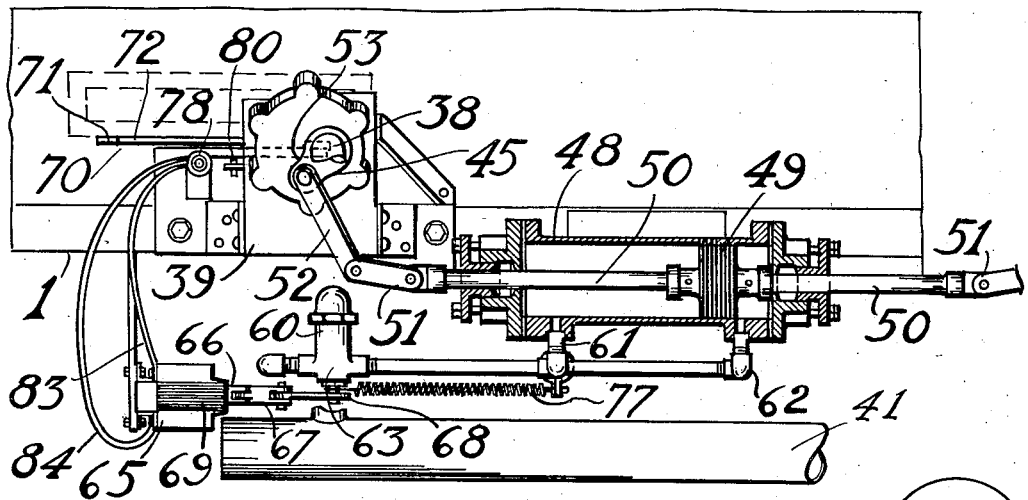
Fig. 7 is a detail top plan view of the mold filling mechanism.
Figure 6:
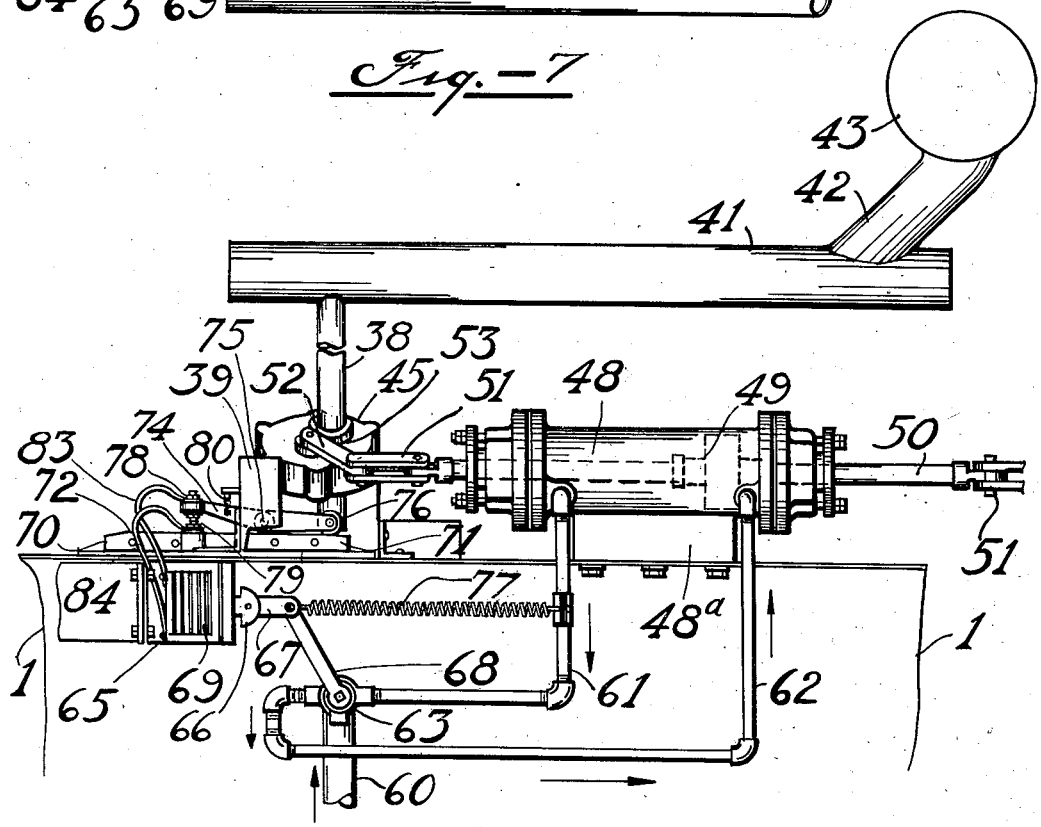
Fig. 6 is a side elevational view looking along the line VI—VI of Fig. 1 showing the mold filling mechanism.

The cakes of wax are ejected from the molds at a station N through the following arrangement of parts: A knockout cam 100 having oppositely inclined camfaces 101 and 102 depends from the under surface of the bracket 10. The cam 100 engages an ejector 103 (see Figs. 2 and 3) reciprocably mounted in the bottom wall of the mold to eject the cakes from the mold. The ejector 103 comprises a frame which connects the pistons 104 of a ram 105 reciprocably mounted within housings 106 protruding from the bottom of the molds. Suitable packing 107 prevents leakage of the molten material from the mold.

The ejected wax cakes drop from the molds into chutes 110 which direct falling cakes upon conveyors 111. The conveyors 111 carry the cakes to suitable riser cutoff machines 112 (see Fig. 1) where the excess wax is removed from the cakes. The molds are returned to their initial position by engagement of the camrolls 96 and 98 with camways 114, 115 and 116 which reverse the rotation of the molds in a manner corresponding to that effected by the camways 94, 93 and 92 respectively. The empty molds are now conducted along the trackway into the inlet end of the trough. There is a continuous motion of the conveyor chain carrying the molds through the filling, cooling and ejecting operations, and thence through the same cycle repeatedly.

Each mold is preferably made of five pieces, namely, sides, ends and bottoms with all surfaces ground to a smooth finish, and tapered approximately .030" in its length, except the upper or riser portion which is tapered approximately 1" per foot. This riser taper has the effect due to the contraction taking place on solidification of the wax, of exerting a lifting force to the cake thereby assisting the removal of the cake. This upper or riser section also provides additional capacity which produces a solid cake for a given size after the contraction is complete.

The individual cakes are molded vertically lengthwise which allowed for shrinkage by cooling so that when the riser is cut off, a uniform size of cake is obtained with a maximum weight per cubic inch. The molds are preferably made of aluminum finned on the outside, whereby optimum transmission of heat is obtained. The fins increase the exposed cooling area of the molds approximately 150% and thereby reduce the cooling time. Being made of aluminum, the molds are light in weight. A solid and uniform cake is provided. The molds are made sufficiently long to compensate for the settling out of the wax as cooling and attendant contraction take place. The depression or crevice caused by the contraction is deepest at the center of the cake. The slightly tapered interior surface of the molds permits ready removal of the cakes from the molds. The hangers maintain the molds in a definite position vertically for proper submergence in the cooling medium and hold the mold trunnion in a fixed position while turning the mold over and ejecting the cake. The pressure required to eject the cake is very slight, since in cooling the wax is contracted sufficiently to leave the sides, the bottom of the wax cake being the only surface of the cake adhering to the mold.

By the construction described, fast and accurate intermittent filling is attained. Furthermore, for cakes of the size and the position in which they are molded, the method lends itself to uniform filling, permits separate molds, affords efficient cooling by reason of the greater part of the mold being in contact with the cooling medium, eliminates overflowing of the molds, and allows sufficient space between the molds to permit turning them over for ejecting the cake.

While the invention has been described as applied to the molding of wax, it will be understood that it can be applied to the molding of other moldable material, such as soap or other products that are liquid when hot and solidify on cooling and some of the advantages of the invention will be retained.

Various changes may be made within the scope of the appended claims in which it is desired to claim all novelty inherent in the invention as broadly as the prior art permits.

I claim:

1. In a molding machine comprising an endless conveyor carrying suspended molds, a source of molten material having a valved delivery pipe, and means for cooling and solidifying the molten material in the molds into cakes, the improvements which comprise an air cylinder operatively connected to the valve in the delivery pipe, a four-way air valve for controlling the flow of air which actuates the air cylinder, electrical control means for the four-way valve, means carried by the molds for actuating the electrical control, means whereby a measured quantity of the molten material is delivered to the molds, and means for ejecting the cakes from the molds.

2. In a molding machine comprising an endless conveyor carrying suspended molds, a source of molten material having a valved delivery pipe, and a trough containing cooling liquid for cooling and solidifying the molten material in the molds into cakes, the improvements which comprise an air cylinder operatively connected to the valve in the delivery pipe, a four-way air valve controlling the flow of air which actuates the air cylinder, electrical control means for the four-way air valve, means carried by the molds for actuating the electrical control means whereby a measured quantity of the molten material is delivered to the molds, means for inverting the chilled molds, and means for ejecting the cakes from the inverted molds.

3. In a molding machine comprising an endless conveyor carrying suspended molds, a source of molten material having a valved delivery pipe, control means for the valve, and means for cooling and solidifying the molten material in the molds into cakes, the improvements which comprise means carried by the molds for actuating the control means whereby a measured quantity of the molten material is delivered to the molds, rolls carried by the molds, a fixed camway engaged by the rolls to invert the molds, and means for ejecting the cakes from the inverted molds.

4. In a molding machine comprising an endless conveyor carrying suspended molds, a source of molten material having a valved delivery pipe, control means for the valve, and a trough containing cooling fluid for cooling and solidifying the molten material in the molds into cakes, the improvements which comprise means carried by the molds for actuating the valve control means whereby a measured quantity of the molten material is delivered to the molds, means for inverting the molds, ejecting means in the base of the molds, and a fixed cam adapted to engage the ejecting means to force the cakes from the molds.

5. In a molding machine comprising a plurality of mold units, each mold unit including a plurality of molds and means securing the molds together in spaced relation to each other to form the unit, a hanger, and an arm pivotally supported by the hanger securing the mold units to each other in spaced relation, the improvements which comprise cake ejecting means in the closed ends of the molds, and means securing the ejecting means of each mold unit together.

6. In a molding machine comprising a frame, a conveyor associated with the frame carrying suspended molds adapted to contain cakes, and means for driving the conveyor in continuous travel, the improvements which comprise means associated with the frame for inverting the molds with respect to the portion of the conveyor supporting the molds, cake ejecting means in the molds, and means associated with the frame for operating the ejecting means to force the cakes from the inverted molds.

7. In a molding machine comprising a frame, a conveyor associated with the frame carrying suspended molds adapted to contain cakes, and means for driving the conveyor in paths extending laterally of each other, the improvements which comprise means for inverting the molds with respect to the portion of the conveyor supporting the molds, cake ejecting means protruding from the base of each mold, a fixed cam carried by the frame in the path of the protruding portion adapted to be engaged by the protruding portion to force the cakes from the molds and means for returning the inverted molds to an upright position.

8. In a molding machine comprising a frame, a mold adapted to contain a cake, a conveyor associated with the frame and pivotally suspending the mold and means for driving the conveyor, the improvements which comprise an arm projecting laterally from the mold at an intermediate portion of the mold spaced from the pivot, an arm projecting laterally from the mold at the base of the mold, and camways carried by the frame at different angles to the horizontal, but successively receiving and guiding the arms to invert the mold.

9. In a molding machine comprising a frame, a conveyor associated with the frame, a hanger, a plurality of mold units, each mold unit including a plurality of molds and means securing the molds together in spaced relation to each other to form a unit, and a frame pivotally supported by the hanger securing the mold units to each other in spaced relation, the improvements which comprise cake ejecting means in the closed ends of the molds, means securing the ejecting means of each mold unit together, lugs projecting from one of the molds at spaced intervals longitudinally of the mold, a plurality of camways carried by the frame at angles adapted to drive the lugs to rotate the mold units around the arm to an inverted position, and a fixed cam carried by the frame in the path of the ejecting means adapted to be engaged by the passing molds to force the cakes therefrom.

10. In a molding machine, a conveyor carrying molds adapted to contain cakes, means for driving the conveyor in paths laterally of each other, means for inverting each mold with respect to the portion of the conveyor supporting the mold whereby the cake can be ejected from the mold, and means for returning the mold to its original position with respect to the conveyor.

11. In a molding machine, an endless conveyor, a hanger suspended from the conveyor, a plurality of molds, an arm securing the molds in spaced relation to each other, the arm being pivotally supported by the hanger, means for driving the conveyor, and means fixed with respect to the conveyor for rotating the molds around the arm to an inverted position.

12. In a molding machine, an endless conveyor, a hanger suspended from the conveyor, a plurality of molds, an arm securing the molds in spaced relation to each other, the arm being pivotally supported by the hanger, spring means associated with the hanger engaging the adjoining molds to normally keep the molds in their upright position, means for driving the conveyor, and means fixed with respect to the conveyor for rotating the molds around the arm to an inverted position.

ADEN A. ENGLISH.